United States Patent
Ottaway et al.

(10) Patent No.: US 10,358,097 B2
(45) Date of Patent: Jul. 23, 2019

(54) ROOF BOX APPARATUS

(71) Applicants: Richard Ottaway, Ashford (GB); Gary Glen Knight, Ashford (GB)

(72) Inventors: Richard Ottaway, Ashford (GB); Gary Glen Knight, Ashford (GB)

( * ) Notice: Subject to any disclaimer, the term of this patent is extended or adjusted under 35 U.S.C. 154(b) by 0 days.

(21) Appl. No.: 15/534,437

(22) PCT Filed: Dec. 1, 2015

(86) PCT No.: PCT/GB2015/053673
§ 371 (c)(1),
(2) Date: Jun. 8, 2017

(87) PCT Pub. No.: WO2016/092264
PCT Pub. Date: Jun. 16, 2016

(65) Prior Publication Data
US 2018/0257579 A1    Sep. 13, 2018

(51) Int. Cl.
*B60R 9/055*    (2006.01)

(52) U.S. Cl.
CPC .................... *B60R 9/055* (2013.01)

(58) Field of Classification Search
CPC ........................................... B60R 9/055
USPC ........................................... 224/328
See application file for complete search history.

(56) References Cited

U.S. PATENT DOCUMENTS

| | | | |
|---|---|---|---|
| 2,812,992 A * | 11/1957 | Lysen | B60R 9/055 224/328 |
| 3,170,583 A * | 2/1965 | Meyer | B60P 3/1025 224/310 |
| 3,481,518 A * | 12/1969 | Anetsberger | B60P 3/1025 224/310 |
| 3,888,398 A | 6/1975 | Payne | |

(Continued)

FOREIGN PATENT DOCUMENTS

| | | | |
|---|---|---|---|
| DE | 2945208 A1 * | 5/1981 | A45C 5/00 |
| DE | 3812067 A1 | 10/1989 | |

(Continued)

OTHER PUBLICATIONS

UK Search Report of Application Serial No. GB 1421974.5 dated Apr. 1, 2016, 6 pages.

(Continued)

*Primary Examiner* — Justin M Larson
(74) *Attorney, Agent, or Firm* — Fay Sharpe LLP

(57) ABSTRACT

The invention relates to a roof box (1). Roof box (1) has a housing with a main cavity (2) for housing sheet material. The housing has front and rear end walls (4,5) and opposing side walls (6). Connection means (20) are provided to connect the housing to a vehicle. An opening (9) is provided through which sheet material can be introduced into the main cavity and one or more rollers (10) may be provided at or adjacent the opening. The side walls may extend outwardly at or adjacent the rear of the cavity. A pair of elongate secondary side cavities (12) and a front wall member may be (Continued)

provided on top of the main cavity to create a loading space therebetween. A rear holding plate may be removably located in one or more sets of slots provided in the elongate secondary side cavities. The elongate side cavities may be extendable.

18 Claims, 5 Drawing Sheets

(56) References Cited

U.S. PATENT DOCUMENTS

| | | | | |
|---|---|---|---|---|
| 4,117,964 | A | * | 10/1978 | Sage ........................ B60R 9/055 220/668 |
| 5,799,848 | A | * | 9/1998 | Wills ................... A63C 11/026 224/328 |
| 5,904,463 | A | * | 5/1999 | Christensen ............ B60R 9/042 224/310 |
| 6,561,397 | B1 | | 5/2003 | Bauer et al. |
| 7,877,922 | B1 | * | 2/2011 | Petrie ..................... A01K 97/08 206/315.11 |
| 2012/0181313 | A1 | * | 7/2012 | Sautter ................... B60R 9/042 224/310 |

FOREIGN PATENT DOCUMENTS

| | | |
|---|---|---|
| DE | 9111607 U1 | 11/1991 |
| FR | 2445246 A1 | 7/1980 |
| FR | 2447846 A1 | 8/1980 |
| FR | 2797828 A1 | 3/2001 |
| GB | 2272426 A | 5/1994 |
| GB | 2496618 A | 5/2013 |
| GB | 2498357 A | 7/2013 |
| WO | WO 2011015742 A1 | 2/2011 |

OTHER PUBLICATIONS

International Search Report and Written Opinion of International Application No. PCT/EP2015/053673 dated Aug. 3, 2016, 10 pages.

* cited by examiner

ROOF BOX APPARATUS

CROSS-REFERENCE TO RELATED APPLICATIONS

This application is a National Stage Entry of PCT/GB2015/053673, and claims priority to, and the benefit of, Great Britain Patent Application No. GB 1421974.5, filed Dec. 10, 2014, the entirety of which is hereby incorporated by reference as if fully set forth herein.

The present invention relates to a roof box apparatus, and more particularly to such apparatus for use with a vehicle such as a van.

In this connection, many builders carry building equipment around in vans or cars. Some builders need to carry sheet material around which is too large to fit into many small vans or cars. If carried on roof racks, such sheet material can readily become soiled by the weather or damaged when unloading or loading the material onto a roof rack. In this regard, plasterboard in particular is easily soiled.

As a result, tradesmen that carry sheet material on a regular basis often need to purchase or lease a larger van which adds to their costs. This will be not only in the purchase or lease cost, but also in the running costs of the van. Furthermore, a larger van will be less environmentally friendly and from a practical standpoint harder to park where space is an issue.

Whilst such sheet material may fit into a larger van, it will need to be placed on the van floor to avoid it falling over but can still slide around and become damaged. Also, if other items such as tools and fastenings are stored on top of the sheet material on the van floor, the sheet material cannot be removed without first removing the other items, which can also further damage the sheet material.

In this regard, in our earlier patent application, GB2498357, we disclosed a bespoke roofbox for carrying sheet material on both large and small vans. The present invention seeks to provide an improved roof box that further addresses the problems identified in our earlier patent application.

According to the present invention there is provided a roof box comprising: —a housing with a main cavity for housing sheet material, said housing having front and rear end walls, and opposing side walls, connection means for connecting the housing to a vehicle, and an opening through which sheet material can be introduced into the main cavity; wherein one or more rollers are provided at or adjacent the opening. In this manner, sheet material can more readily be loaded into and unloaded from the roof box.

Preferably, the one or more rollers extend substantially across the opening. As such, relatively wide sections of sheet material can be readily handled. Whilst other locations are feasible, the opening is preferably provided at said rear end wall.

Preferably, the main cavity has a base having a base surface for receiving said sheet material, the one or more rollers being housed within the base, with an upper roller surface extending above the base surface. In this manner, sheet material can be pivoted on the rollers before being slid into the cavity. The base surface may in this regard comprise a plurality of runners extending longitudinally into the cavity.

According to a further aspect of the present invention there is provided a roof box comprising: —a housing with a main cavity for housing sheet material, said housing having front and rear end walls, and opposing side walls, connection means for connecting the housing to a vehicle, and an opening through which sheet material can be introduced into the main cavity; wherein the side walls of the cavity extend laterally outwardly at or adjacent the rear of the cavity. In this manner, sheet material that would otherwise be tight to the internal sides of the cavity can be readily handled.

Preferably, an access portion of the side walls is formed where they extend laterally outwardly at or adjacent the rear end wall, the access portion providing an access space for handing sheet material introduced into the cavity.

Conveniently, the access portion flares outwardly towards the rear of the cavity. This assists with the aerodynamics of the roof box.

According to yet a further aspect of the present invention there is provided roof box comprising: —a housing with a main cavity for housing sheet material, said housing having front and rear end walls, and opposing side walls, connection means for connecting the housing to a vehicle, and an opening through which sheet material can be introduced into the main cavity; the roof box further comprising a pair of elongate secondary side cavities and a front wall member provided on top of the main cavity to create a loading space there-between, the front wall member having one or more drainage openings for draining any water from said loading space. As such, water that may collect in the loading space can readily drain away.

Preferably, the drainage openings are provided in the form of slots extending substantially vertically through the front wall. Conveniently, two drainage openings are provided.

According to yet a further aspect of the invention there is provided a roof box comprising: —a housing with a main cavity for housing sheet material, said housing having front and rear end walls, and opposing side walls, connection means for connecting the housing to a vehicle, and an opening through which sheet material can be introduced into the main cavity; the roof box further comprising a pair of elongate secondary side cavities and a front wall member provided on top of the main cavity to create a loading space there-between, and a rear holding plate that is removably located in one or more sets of slots provided in the elongate secondary side cavities.

Preferably, the rear holding plate is provided with one or more drainage openings.

Conveniently, the elongate secondary side cavities are provided with two or more sets of slots for receiving the rear holding plate.

In preferred embodiments, the housing is preferably of a size to accommodate sheet material of a standard size of 4 ft×8 ft or 1200 mm×2400 mm.

The sealable opening that forms the rear wall may be a flap.

The elongate secondary side cavities may accommodate elongate building material such as pipes and lengths of wood. Each elongate secondary side cavity may include a sealable opening. The sealable opening may be provided by a flap.

Preferably, the housing is formed of upper and lower components hinged together to allow the housing to be opened. The upper and lower components may be hinged along one side edge of the housing. Preferably one or more locks are provided along the other side edge.

The bottom of the housing may include elongate ribs providing runners along which sheet material is supported and can slide.

Conveniently, the main cavity includes a removable dividing baffle to divide the main cavity into two compartments.

Preferably, a pair of opposing grooves is provided in the bottom and the top of the main cavity to accommodate upper and lower sides of the baffle.

One or more roof bars may be provided above the housing. The roof bars may in this regard span between said pair of elongate secondary side cavities. Particularly when used in conjunction with the rear holding plate, the area beneath the roof bars offers a volume in which further material can be securely stowed.

Conveniently, a front baffle is provided in the main cavity to limit movement of sheet material in the main cavity and a storage chamber is provided between the front baffle and the front end wall of the housing.

According to a further aspect of the present invention there is provided a roof box comprising: —a housing with a main cavity for housing sheet material, said housing having front and rear end walls, and opposing side walls, connection means for connecting the housing to a vehicle, and an opening through which sheet material can be introduced into the main cavity; the roof box further comprising one or more elongate secondary side cavities on top of the main cavity, wherein one or both the elongate secondary side cavities are extendable for increasing their carrying capacity. In this way, each elongate secondary side cavity that has the extending function can be used to accommodate longer pipes or the like as and when this is required.

Preferably, one or both the elongate secondary side cavities comprise a front portion that can slide between standard and extended positions. In this way, the elongate secondary side cavity can be extended to allow for loading of various lengths of materials. Conveniently, the front portion slides on a track.

Furthermore, one or each of the elongate secondary side cavities may be removably mounted on the main cavity. This can be achieved using clips or the like.

An embodiment of the present invention will now be described with reference to the accompanying drawings in which.

Figure 1:
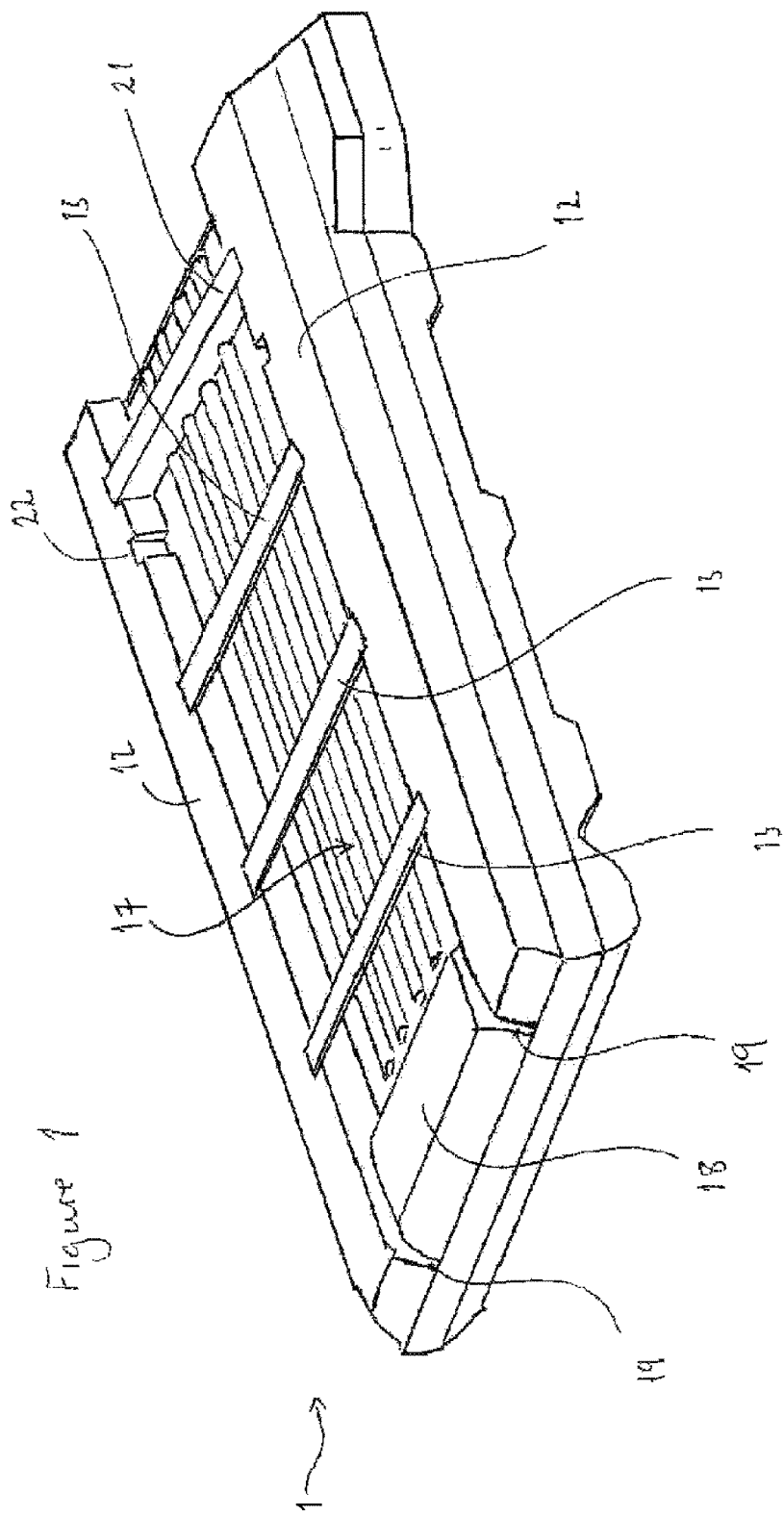
FIG. 1 shows a perspective view of the roof box of the present invention with a lid in a closed position.
Figure 2:
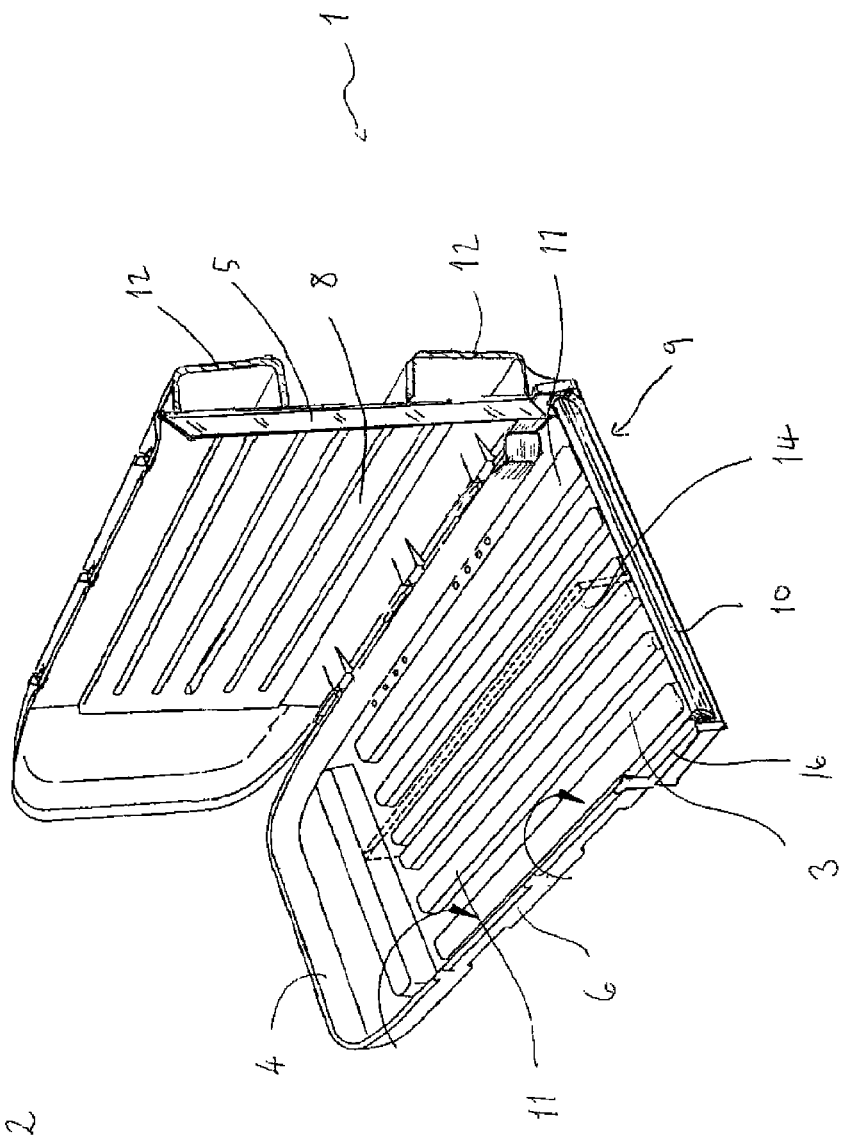
FIG. 2 shows the roof box of FIG. 1 with the lid open.

Referring to the various views of FIGS. 1 to 10, there is shown a roof box 1. The roof box 1 is formed of a housing having a main cavity 2 formed with front and rear end walls 4, 5 and opposing side walls 6. The housing has a base 7 and a lid 8 hinged thereto alongside wall 6. Locks can be provided to releasably hold the base and lid together. The housing can be formed from any suitable material and using any suitable production methods, for example from plastics or composites by vacuum moulding techniques.

The main cavity 2 is used for storing and transporting sheet material (e.g. plasterboard or wood such as chipboard, MDF, Blockboard etc), normally of a standard size of 4 ft×8 ft or 1200 mm×2400 mm.

A sealable opening 9 in the main cavity 2 in the form of a hinged flap forms the rear wall 5. The opening 9 allows access into the cavity 2 for stowing said material. The flap provides a weatherproof seal against the housing to protect the sheet material and any other objects in the main cavity from the weather.

Figure 4:
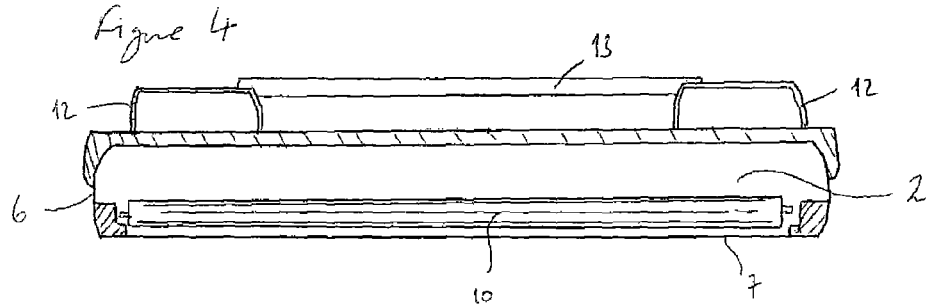
FIG. 4 shows a cross-sectional rear view of the roof box of FIG. 1.

As shown in FIG. 1 and the cross-sectional view of FIG. 4, a roller 10 is mounted just inside the opening at the rear of the cavity and extends just above the height of runners 11 provided within the interior of the cavity 2. In this manner, with the opening opened up for access, a sheet (not shown) can be propped up against the roller, lifted and pivoted thereon and then slid into the cavity. Further rollers may of course be mounted within the cavity to further assist the loading and unloading of sheet material.

It will be appreciated that the opening is shown in this preferred embodiment at the rear of the roof box, but could in an alternative embodiment be provided at a side of the roof box or even the front of the box, where the roof box extends sufficiently forward of the vehicle bonnet. In this event the roller would need to be appropriately orientated.

Figure 6:
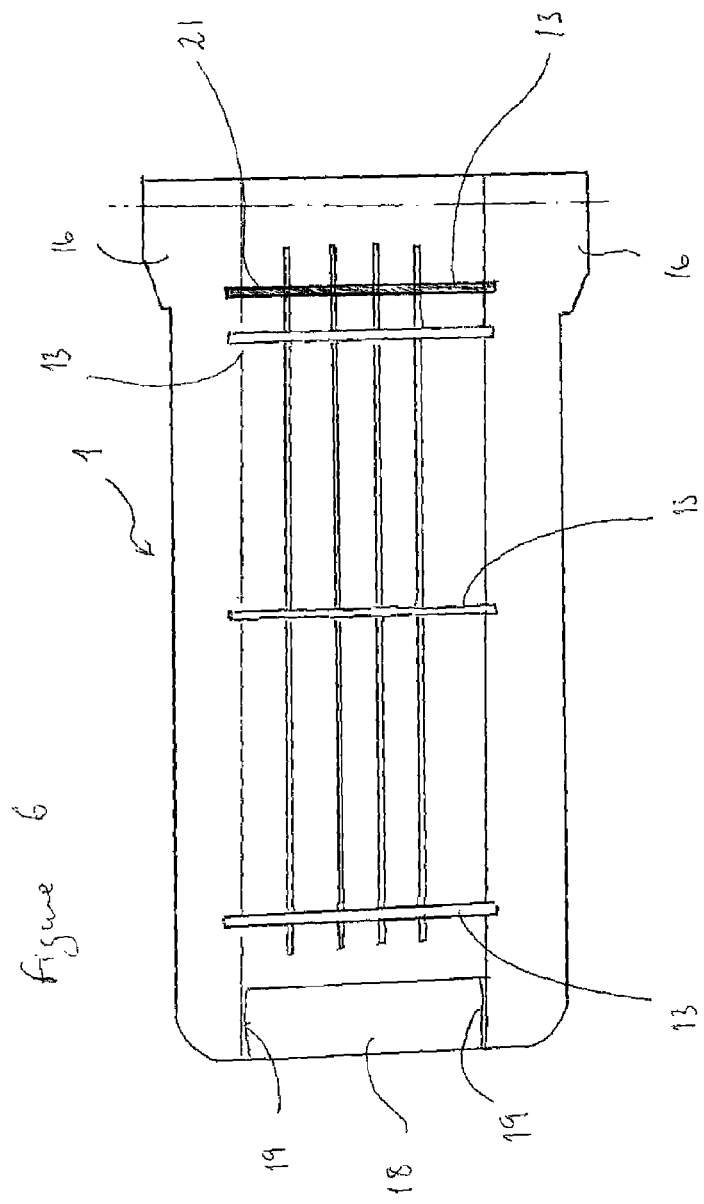
FIG. 6 shows a top view of a stop end plate.

As shown particularly in FIGS. 1 and 6, the side walls 6 flare outwardly in the region of the opening to form access regions 16, which expand the cavity in this area. This is to enable sheet material to be handled more readily within the cavity, since the access regions allow a user to insert their hands into the cavity and grasp the sides of a sheet that would otherwise be tight to the internal sides of the cavity.

A pair of elongate secondary side cavities 12 are provided on top of the main cavity 2. The elongate secondary side cavities may accommodate elongate building material such as pipes and lengths of wood. Each elongate secondary cavity include a sealable opening in the form of a hinged flap to protect the contents of each secondary cavity from the weather.

A plurality of roof bars 13 span between and are supported by the elongate secondary side cavities 12. These roof bars may be used to transport additional items such as ladders or other building items, so that in addition to the functionality provided by the roof box itself, the roof bars 13 can in fact be arranged and used much like the bars of a conventional roof rack.

Figure 3:
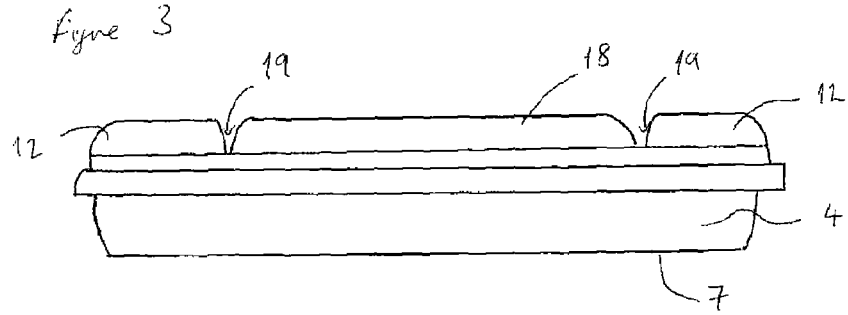
FIG. 3 shows a front view of the roof box of FIG. 1.

As shown in FIGS. 1 and 3, a loading space 17 is formed between the elongate secondary side cavities 12 and a front wall member 18. In this connection, water can undesirably collect in this space, which can damage items stored there, and which can also be dangerous when pulling away as it flows rapidly off the back of the roof box. In order to prevent such water build up, drainage openings in the form of slots 19 are provided in the front wall member.

The main cavity includes a removable dividing baffle 14 to divide the main cavity into two compartments. Preferably a pair of opposing grooves is provided in the bottom base and the top lid of the main cavity to accommodate upper and lower sides of the baffle. This allows half sheets of material e.g. 4 ft×2 ft or 600×2400, to be placed into each compartment of the divided main cavity.

Figure 5:
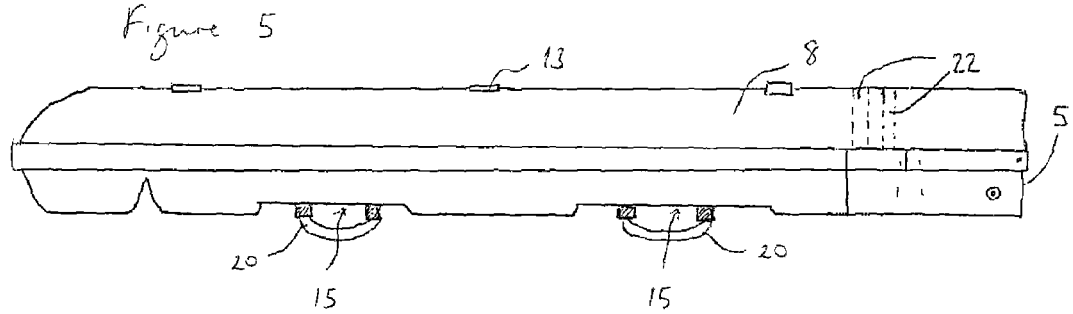
FIG. 5 shows a side view of the roof box of FIG. 1.

As shown in FIG. 5, the housing comprises suitable mountings 20 on its undersurface, for example within recesses 15, that are suitable for receiving attachment means for securing the roof box to the roof of a vehicle. The roof box may be connected to a vehicle roof via roof bars for example.

FIGS. 1, 5 and 6 show a stop end plate 21 that is received in slot 22 which assists to secure items loaded in the loading space 17. The plate 21 closes the loading space 17. A number of slots 22 may be provided so that the plate can be located at various locations. The plate may be ventilated and/or have drainage holes to allow water to drain away.

Figure 7:
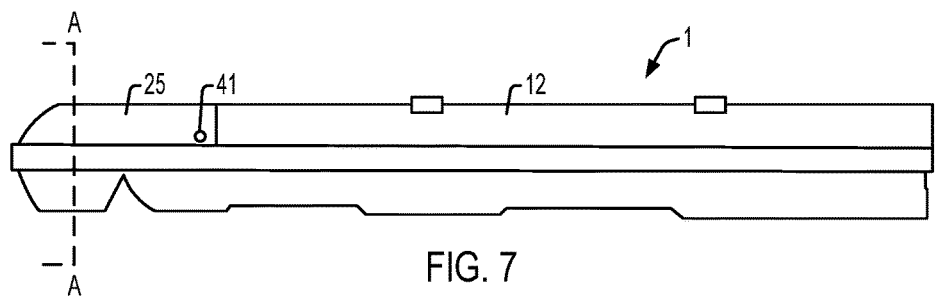
FIG. 7 shows a side view of a further embodiment of the roof box of the present invention.
Figure 8:
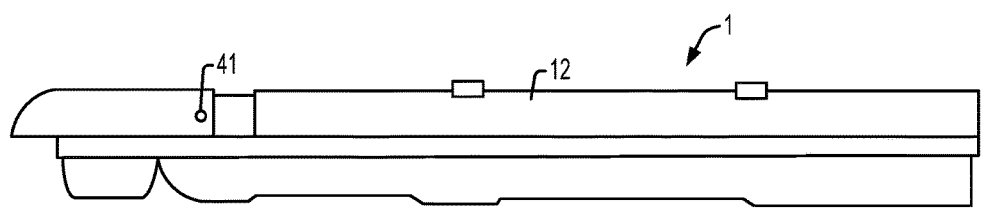
FIG. 8 shows a side view of the roof box of FIG. 7 in an extended position.
Figure 9:
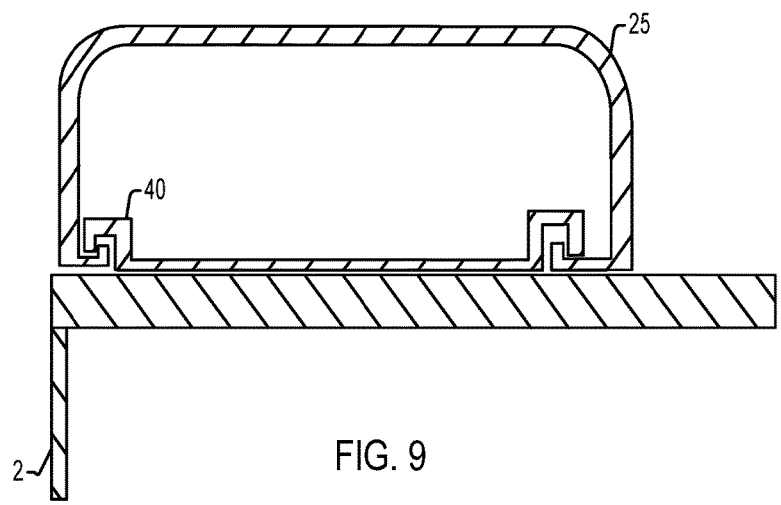
FIG. 9 shows a cross-sectional view through the line A-A in FIG. 7.

FIGS. 7 to 9 show a further embodiment of the present invention where the elongate secondary side cavity 12 may be extended between a standard length as shown in FIG. 7 to an extended length as shown in FIG. 8. This is achieved by having a front portion 25 that can be slid forwards and rearwards by way of it being mounted on track 40 as shown in FIG. 9, which is secured to the top of the main cavity 2.

Though the sizes may vary, when in the standard length position shown in FIG. 7, pipes of, for example, up to 2.5 m may be carried in the secondary side cavity 12. However, for certain situations, lengths of up 3 m may be needed, so that the front portion 25 can be moved forward to the position shown in FIG. 8. Suitable locking means may be provided such as a biased peg 41, to hold the front portion in the desired position.

Figure 10:
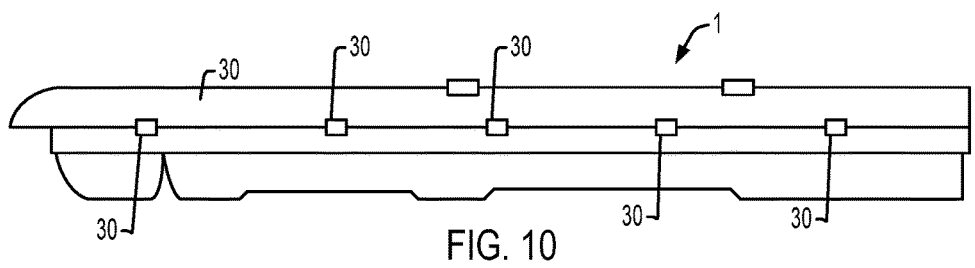
FIG. 10 shows a side view of a further embodiment of the present invention.

In a further alternative embodiment as shown in FIG. 10, the whole of the secondary side cavity 12 may be removably secured to the main cavity, such that for certain applications it can be removed and replaced with for example, a secondary side cavity 30 of a greater length. The secondary side cavity may be removably secured using any suitable mechanism, for example, clips 31 or the like.

Further modifications will be apparent to those skilled in the art without departing from the scope of the present invention.

The invention claimed is:

1. A roof box comprising:
a housing with a main cavity for housing sheet material, said housing having front and rear end walls, and opposing side walls,
connection means for connecting the housing to a vehicle, and
an opening through which sheet material can be introduced into the main cavity; wherein one or more rollers are provided at the opening
wherein the roof box further comprises a pair of elongate secondary side cavities and a front wall member provided on top of the main cavity to create a loading space there-between, the front wall member having one or more drainage openings for draining any water from said loading space.

2. The roof box of claim 1, wherein the one or more rollers extend across the opening.

3. The roof box of claim 1, wherein the opening is provided at said rear end wall.

4. The roof box of claim 1, wherein the cavity has a base having a base surface for receiving said sheet material, the one or more rollers being housed within the base with an upper roller surface extending above the base surface.

5. The roof box of claim 1, wherein the side walls of the cavity extend laterally outwardly at the rear of the cavity.

6. The roof box of claim 1, further comprising a rear holding plate that is removably located in one or more sets of slots provided in the elongate secondary side cavities.

7. A roof box comprising:
a housing with a main cavity for housing sheet material, said housing having front and rear end walls, and opposing side walls,
connection means for connecting the housing to a vehicle, and
an opening through which sheet material can be introduced into the main cavity; wherein the side walls of the cavity extend laterally outwardly at the rear of the cavity,
wherein the roof box further comprises a pair of elongate secondary side cavities and a front wall member provided on top of the main cavity to create a loading space there-between, the front wall member having one or more drainage openings for draining any water from said loading space.

8. The roof box of claim 7, wherein an access portion of the side walls is formed where they extend outwardly at the rear end wall to provide an access space for handing sheet material introduced into the cavity.

9. The roof box of claim 7, wherein the access portion flares outwardly towards the rear of the cavity.

10. The roof box of claim 7, further comprising a rear holding plate that is removably located in one or more sets of slots provided in the elongate secondary side cavities.

11. The roof box of claim 7, further comprising a rear holding plate that is removably located in one or more sets of slots provided in the elongate secondary side cavities.

12. The roof box of claim 11, wherein the rear holding plate is provided with one or more drainage openings.

13. The roof box of claim 11, wherein the elongate secondary side cavities are provided with two or more sets of slots for receiving the rear holding plate.

14. The roof box of claim 11, wherein one or more roof bars are provided above the housing.

15. A roof box comprising:
a housing with a main cavity for housing sheet material, said housing having front and rear end walls, and opposing side walls,
connection means for connecting the housing to a vehicle, and
an opening through which sheet material can be introduced into the main cavity;
the roof box further comprising a pair of elongate secondary side cavities and a front wall member provided on top of the main cavity to create a loading space therebetween, the front wall member having one or more drainage openings for draining any water from said loading space.

16. The roof box of claim 15, wherein the drainage openings are provided in the form of slots extending vertically through the front wall member.

17. The roof box of claim 15, wherein two drainage openings are provided.

18. The roof box of claim 15, further comprising a rear holding plate that is removably located in one or more sets of slots provided in the elongate secondary side cavities.

* * * * *